US012767380B2

(12) United States Patent
Spahlinger

(10) Patent No.: US 12,767,380 B2
(45) Date of Patent: Oct. 20, 2026

(54) CARTON WITH LOCKING FEATURES

(71) Applicant: GPI Frankfurt & Augsburg GmbH, Kriftel (DE)

(72) Inventor: Carolin Spahlinger, Hattersheim am Main (DE)

(73) Assignee: GPI Frankfurt & Augsburg GmbH, Kriftel (DE)

( * ) Notice: Subject to any disclaimer, the term of this patent is extended or adjusted under 35 U.S.C. 154(b) by 1 day.

(21) Appl. No.: 18/218,757

(22) Filed: Jul. 6, 2023

(65) Prior Publication Data

US 2024/0010385 A1 Jan. 11, 2024

(51) Int. Cl.
*B65D 5/32* (2006.01)
*B31B 50/26* (2017.01)
(Continued)

(52) U.S. Cl.
CPC ............ *B65D 5/328* (2013.01); *B31B 50/262* (2017.08); *B65D 5/321* (2013.01); *B65D 5/4266* (2013.01);
(Continued)

(58) Field of Classification Search
CPC ...... B65D 5/328; B65D 5/321; B65D 5/4266; B65D 2215/02; B65D 2215/06;
(Continued)

(56) References Cited

U.S. PATENT DOCUMENTS 200,401 A 2/1878 Knapp
1,048,577 A 12/1912 Avern, Jr.
(Continued)

FOREIGN PATENT DOCUMENTS

AT 334276 B 1/1976
CH 412 695 4/1966
(Continued)

OTHER PUBLICATIONS

International Search Report and Written Opinion for PCT/US2023/026994 dated Oct. 26, 2023.
(Continued)

*Primary Examiner* — Christopher R Demeree
(74) *Attorney, Agent, or Firm* — Andrew N. Claerbout; FisherBroyles, LLP

(57) ABSTRACT

A carton comprising an inner construct comprising a plurality of inner panels extending at least partially around a first interior and an inner locking tab foldably connected to at least one inner panel. An outer construct can comprise a plurality of outer panels extending at least partially around a second interior. The outer construct can comprise an outer locking tab foldably connected to at least one outer panel, and the inner locking tab and the outer locking tab can cooperate to limit movement between the inner construct and the outer construct. The carton also can comprise an engagement feature comprising a cover panel that is at least partially separable from the at least one outer panel. The inner locking tab of the inner construct can extend along the engagement feature in the outer construct so that the inner locking tab can be engaged when the cover panel is at least partially removed for facilitating movement of the inner construct and the outer construct relative to one another.

25 Claims, 9 Drawing Sheets

(51) Int. Cl.
*B31B 105/00* (2017.01)
*B31B 110/35* (2017.01)
*B31B 120/10* (2017.01)
*B31B 120/30* (2017.01)
*B65D 5/42* (2006.01)

(52) U.S. Cl.
CPC ....... *B31B 2105/00* (2017.08); *B31B 2110/35* (2017.08); *B31B 2120/10* (2017.08); *B31B 2120/302* (2017.08)

(58) Field of Classification Search
CPC . B65D 5/685; B65D 5/38; B65D 5/22; B65D 5/6608; B65D 2251/1066; B65D 7/10
USPC ...... 229/122.32, 125.26, 125.28, 102, 160.2, 229/117.17, 125.125, 125.27, 145; 206/807, 815, 1.5; 220/345.3
See application file for complete search history.

(56) References Cited

U.S. PATENT DOCUMENTS 1,130,271 A 3/1915 Hammond
1,253,489 A 1/1918 Houghland
1,664,308 A 3/1928 Miller
1,951,274 A 3/1934 Denman
2,054,596 A 9/1936 Ford
2,069,281 A 2/1937 Sebreny
2,180,808 A 11/1939 Jacobstein
2,194,220 A 3/1940 Elder
2,251,283 A 8/1941 Johnson
2,331,754 A 10/1943 Friedrich
2,335,363 A 11/1943 Shelton
2,369,387 A 2/1945 Williamson
2,396,310 A 3/1946 Yungblut
2,474,523 A 6/1949 Guyer
2,559,320 A 7/1951 Rushing
2,579,346 A 12/1951 Theander
2,610,770 A 9/1952 Penfield
2,745,589 A 5/1956 Daly
2,777,630 A 1/1957 Moberger
D179,932 S 3/1957 Currie
D179,933 S 3/1957 Currie
2,836,343 A 5/1958 Will
2,877,736 A 3/1959 Simmons
2,898,004 A 8/1959 Klausmann et al.
2,899,123 A 8/1959 Currie, Jr.
2,943,769 A 7/1960 Klausmann
2,970,742 A 2/1961 Fleisig
2,975,952 A 3/1961 Tamarin
2,980,540 A 4/1961 Turpin
2,983,424 A 5/1961 Glass
3,033,436 A 5/1962 Peimer
3,040,953 A 6/1962 Tindall
3,049,282 A 8/1962 Chidsey, Jr.
3,055,362 A 9/1962 Uytenbogaar
3,057,524 A 10/1962 Shanks
3,071,882 A 1/1963 Eisman
3,099,381 A 7/1963 Meyers
3,114,474 A 12/1963 Davis
3,116,007 A 12/1963 D'Esposito
3,166,229 A 1/1965 Sherman et al.
3,187,961 A 6/1965 Moore
3,205,603 A 9/1965 Brumley
3,235,144 A 2/1966 Pitkin et al.
3,240,419 A 3/1966 Spiering
3,269,531 A 8/1966 Weiss
3,298,576 A 1/1967 Sellors
3,302,847 A 2/1967 Hennesey
3,310,222 A 3/1967 Buttery
3,347,446 A 10/1967 Guyer et al.
3,366,496 A 1/1968 Bomar
RE26,557 E 3/1969 Houston
3,441,002 A 4/1969 Lawalin et al.
3,512,699 A 5/1970 Wilson
3,533,547 A 10/1970 Houston
3,563,449 A 2/1971 Forbes, Jr.
3,692,231 A 9/1972 Neitzke
3,741,387 A 6/1973 Whitecar
3,804,321 A 4/1974 Forbes, Jr.
3,831,833 A 8/1974 Dressler et al.
3,888,350 A 6/1975 Horvath
3,894,680 A 7/1975 Araki
3,894,681 A 7/1975 Arneson
3,899,121 A 8/1975 Herbetko
3,910,487 A 10/1975 Jaeschke
3,921,862 A 11/1975 Holmstrom
3,958,744 A 5/1976 Herglotz
3,971,505 A 7/1976 Ohkubo
3,981,434 A 9/1976 Ramich
4,004,691 A 1/1977 Wihksne
4,053,100 A 10/1977 Baptist
4,076,117 A 2/1978 Wisdom
4,081,128 A 3/1978 O'Neill
4,083,455 A 4/1978 Keating, Jr.
4,094,456 A 6/1978 Raccoforte
4,102,457 A 7/1978 Meyers
4,111,351 A 9/1978 Forbes, Jr.
4,113,086 A 9/1978 Forbes, Jr.
4,138,016 A 2/1979 Roccaforte
4,141,485 A 2/1979 Lambert
4,155,449 A 5/1979 Bryne
4,196,483 A 4/1980 Kahl, Jr.
4,196,843 A * 4/1980 Garmon ................ B65D 5/685 229/165
4,197,985 A 4/1980 Austin
4,201,329 A 5/1980 Rccaforte
4,261,483 A 4/1981 Dutcher
4,279,373 A 7/1981 Montealgre
4,304,355 A 12/1981 Sykora
4,341,338 A 7/1982 Arnold
4,342,417 A 8/1982 Forbes, Jr.
4,361,270 A 11/1982 Roccaforte
4,401,210 A 8/1983 Anjou
4,441,648 A 4/1984 Portsmouth
4,472,896 A 9/1984 Brauner
4,531,669 A 7/1985 Osborne
4,550,834 A 11/1985 Fletcher
4,609,142 A 9/1986 Adamek
4,630,733 A 12/1986 Fear
4,684,023 A 8/1987 Cortopassi
4,717,070 A 1/1988 Taub
4,812,704 A 3/1989 Van Der Ven
4,834,255 A 5/1989 Boots
4,892,247 A 1/1990 Dirksing
4,901,457 A 2/1990 Chandler
5,040,722 A 8/1991 Fromion
5,050,794 A 9/1991 Wischusen, III
D320,743 S 10/1991 Alexander
5,056,708 A 10/1991 Boyle et al.
5,058,803 A 10/1991 Gulliver
5,103,972 A 4/1992 Ackeret
RE33,979 E 6/1992 Cortopassi
5,154,343 A 10/1992 Stone
5,161,734 A 11/1992 Ruehl
5,205,478 A 4/1993 Wiscusen, III
D342,446 S 12/1993 Parker
D345,272 S 3/1994 Kelsoe
5,299,732 A 4/1994 Armor
D346,552 S 5/1994 Krupa
5,429,297 A 7/1995 Walsh
5,439,133 A 8/1995 Stone
5,450,998 A 9/1995 Esse
5,465,834 A 11/1995 Sieber et al.
5,503,268 A 4/1996 Pham
5,505,374 A 4/1996 Stone
5,511,722 A 4/1996 Dixon
5,515,996 A 5/1996 Stone
5,518,172 A 5/1996 Nanno
5,538,133 A 7/1996 Campbell
5,542,540 A 8/1996 Knapp
5,551,938 A 9/1996 Stone
5,627,150 A 5/1997 Peterson
5,628,533 A 5/1997 Hill

(56) References Cited

U.S. PATENT DOCUMENTS

D379,759 S 6/1997 Mulry
5,662,265 A 9/1997 Jensen
5,690,273 A 11/1997 Jensen
5,697,549 A 12/1997 Yocum
D389,739 S 1/1998 Auclair
5,725,144 A 3/1998 Stone
5,772,030 A 6/1998 Baxter
5,810,250 A 9/1998 Stone et al.
5,826,781 A 10/1998 Jensen
5,875,962 A 3/1999 Jorgensen-Beck et al.
5,875,963 A 3/1999 Stone
D418,052 S 12/1999 Scrimger
6,027,018 A 2/2000 Yocum
6,041,997 A 3/2000 Jensen
6,047,829 A 4/2000 Johnstone
6,068,181 A 5/2000 Cai
6,105,774 A 8/2000 Jackson
6,105,855 A 8/2000 Kackstetter
6,138,904 A 10/2000 Baird
D437,222 S 2/2001 Goldberg
6,213,388 B1 4/2001 Ours et al.
6,230,893 B1 5/2001 Karow
6,296,175 B1 * 10/2001 Dixon .................... B65D 5/685 229/102
6,318,593 B1 11/2001 Laughlin et al.
D458,127 S 6/2002 De Groote
D460,691 S 7/2002 Morris
6,412,636 B1 7/2002 Jones
6,484,931 B1 11/2002 Augusti
D467,499 S 12/2002 Garza
6,491,211 B1 12/2002 Evans
D472,463 S 4/2003 Kinigakis
D473,787 S 4/2003 Jones, Jr.
6,575,299 B1 6/2003 Kinigakis
6,604,676 B2 8/2003 Giblin
6,641,031 B2 11/2003 Evans
D484,043 S 12/2003 Hwang
6,672,474 B2 1/2004 May
6,681,983 B2 1/2004 Bill-Moore
6,708,874 B1 3/2004 Montgomery
6,749,108 B2 6/2004 Naughton
6,752,272 B2 6/2004 Jones
D499,022 S 11/2004 Sun
6,945,449 B2 9/2005 Hengami
6,957,765 B2 10/2005 Howell
7,156,286 B2 1/2007 Hengami
7,353,969 B2 4/2008 McHutchinson
7,367,453 B2 5/2008 Sutherland
7,377,385 B2 5/2008 Giannini
7,389,875 B2 6/2008 Sandberg
7,473,215 B2 1/2009 Moen
7,503,475 B2 3/2009 McGowan
7,523,825 B2 4/2009 Velazquez
7,637,375 B2 12/2009 Sattel
7,658,318 B2 2/2010 Walsh
7,708,142 B2 5/2010 Ehrlund
7,726,552 B2 6/2010 Chadima
7,841,512 B2 11/2010 Westerman
7,854,325 B2 12/2010 Bentele
8,056,799 B2 11/2011 Burke
8,443,978 B2 5/2013 Royer
8,453,840 B2 6/2013 Wharton
8,740,050 B2 6/2014 Zinck
8,746,444 B2 6/2014 Dehlin
8,800,855 B2 8/2014 Fitzwater
8,997,979 B2 4/2015 Ghini
9,359,123 B2 6/2016 Bhattacharjee
9,475,605 B2 10/2016 Everett
9,783,335 B2 10/2017 Everett
D805,898 S 12/2017 Holley, Jr.
9,881,788 B2 1/2018 Kim
9,981,788 B2 5/2018 Skinner
10,017,291 B2 7/2018 Smith
10,053,259 B2 8/2018 Gungner
10,086,972 B2 10/2018 Hajek
10,124,944 B2 11/2018 Smalley
10,232,976 B2 3/2019 Waddington
10,301,091 B2 5/2019 Ramsuer
10,442,600 B2 10/2019 Waltermire
10,479,581 B2 11/2019 Chambers
10,486,849 B2 11/2019 Parkes
10,494,138 B1 12/2019 Velliquette
10,618,684 B2 4/2020 Eckert
10,661,940 B2 5/2020 Hajek
D899,245 S 10/2020 Mori
10,934,072 B2 3/2021 Lantz
D921,982 S 6/2021 Gerhards
11,046,476 B2 6/2021 Whitehurst
11,059,621 B2 7/2021 Nowak
11,365,022 B2 6/2022 Altman
11,794,947 B2 10/2023 Hoefte
11,932,468 B2 3/2024 Hoefte
11,993,434 B2 5/2024 Hoefte
12,012,262 B2 6/2024 Zirollo
12,116,184 B2 10/2024 Hoefte
12,134,503 B2 11/2024 Hoefte
12,162,651 B2 12/2024 Hoefte
12,473,118 B2 11/2025 Kavanagh
12,497,225 B2 12/2025 Thompson
12,570,434 B2 3/2026 Spahlinger
2002/0052302 A1 5/2002 Clark
2003/0047595 A1 3/2003 Bill-Moore
2003/0111523 A1 6/2003 Haugan
2003/0168502 A1 9/2003 Kisch
2003/0213722 A1 11/2003 Kinigakis
2003/0222130 A1 12/2003 Fukushima
2004/0065723 A1 4/2004 Hengami
2004/0074953 A1 4/2004 Yocum
2004/0099565 A1 5/2004 Dehlin
2004/0188300 A1 9/2004 Sutherland
2005/0017061 A1 1/2005 Quaintance
2006/0118451 A1 6/2006 Edwards
2006/0283928 A1 12/2006 Walsh
2007/0221713 A1 9/2007 Wilson
2007/0267467 A1 11/2007 Burke
2008/0054059 A1 3/2008 Chadima
2008/0217204 A1 9/2008 Sattel
2008/0217205 A1 9/2008 Sattel
2008/0257773 A1 10/2008 Gelardi
2008/0265010 A1 10/2008 Montague Kisch
2009/0001145 A1 1/2009 Hasse
2009/0032575 A1 2/2009 Gianfranco
2009/0152134 A1 6/2009 Katsis
2009/0184022 A1 7/2009 Coe
2011/0168767 A1 7/2011 Hengami
2011/0204087 A1 8/2011 Kopulos
2013/0193197 A1 8/2013 Low
2013/0256391 A1 10/2013 Jolley
2013/0306718 A1 11/2013 Sumpmann
2013/0313311 A1 11/2013 Fath et al.
2014/0339293 A1 11/2014 McLeod
2014/0346220 A1 11/2014 Saulas
2015/0034711 A1 2/2015 Pinkstone
2015/0060537 A1 3/2015 Hajek et al.
2015/0083789 A1 3/2015 Fitzwater et al.
2015/0183548 A1 7/2015 Cho
2015/0197386 A1 7/2015 Chang
2015/0232785 A1 8/2015 Paullin
2015/0267155 A1 9/2015 Brooker
2016/0096650 A1 4/2016 Jamison
2016/0122445 A1 5/2016 Nambiar
2016/0152373 A1 6/2016 Linssen
2016/0251107 A1 9/2016 Everett
2016/0264286 A1 * 9/2016 Pinkstone ............ B65D 5/6608
2017/0001751 A1 1/2017 Schow
2017/0001752 A1 1/2017 Ishikawa
2017/0008664 A1 1/2017 Parkes
2017/0036808 A1 2/2017 Everett
2017/0062023 A1 3/2017 Datta
2017/0298308 A1 10/2017 Labeque
2017/0334600 A1 11/2017 Eckert
2018/0022498 A1 1/2018 Everett
2018/0099775 A1 4/2018 Van Waarden
2018/0215513 A1 8/2018 Perek

(56) References Cited

U.S. PATENT DOCUMENTS

| | | | | |
|---|---|---|---|---|
| 2018/0257827 | A1 | 9/2018 | Drosos | |
| 2018/0265816 | A1 | 9/2018 | Lintula | |
| 2018/0346846 | A1 | 12/2018 | Kropf | |
| 2019/0023448 | A1 | 1/2019 | Mehta | |
| 2019/0062023 | A1 | 2/2019 | Lantz et al. | |
| 2019/0084740 | A1 | 3/2019 | Davis et al. | |
| 2019/0135503 | A1 | 5/2019 | De Wilde | |
| 2019/0136153 | A1 | 5/2019 | Dicosimo | |
| 2019/0202942 | A1 | 7/2019 | Lu | |
| 2019/0291917 | A1 | 9/2019 | Curcic | |
| 2019/0344925 | A1 | 11/2019 | Block | |
| 2019/0390138 | A1 | 12/2019 | Sivik | |
| 2020/0002646 | A1 | 1/2020 | Huang | |
| 2020/0087020 | A1 | 3/2020 | Tsai et al. | |
| 2020/0180808 | A1 | 6/2020 | Gauvin | |
| 2020/0189813 | A1 | 6/2020 | Drosos et al. | |
| 2020/0331667 | A1 | 10/2020 | Bressan | |
| 2020/0339303 | A1 | 10/2020 | Zeiler | |
| 2021/0016939 | A1 | 1/2021 | Palmer | |
| 2021/0047072 | A1 | 2/2021 | Ng Pak Leung | |
| 2021/0053715 | A1 | 2/2021 | Tsai | |
| 2021/0171235 | A1 | 6/2021 | Boland | |
| 2021/0269191 | A1 | 9/2021 | Peterson et al. | |
| 2021/0292056 | A1 | 9/2021 | Tidwell | |
| 2021/0347524 | A1 | 11/2021 | Hoefte | |
| 2022/0063877 | A1 | 3/2022 | Forenza | |
| 2022/0081155 | A1 | 3/2022 | Hoefte | |
| 2022/0144507 | A1 | 5/2022 | Ubell | |
| 2022/0169426 | A1 * | 6/2022 | Drosos | B65D 83/0463 |
| 2022/0185534 | A1 | 6/2022 | Hoefte | |
| 2022/0204210 | A1 | 6/2022 | Joines | |
| 2022/0250788 | A1 | 8/2022 | Bressan | |
| 2022/0289425 | A1 | 9/2022 | Green | |
| 2022/0289436 | A1 | 9/2022 | Hoefte | |
| 2022/0306336 | A1 | 9/2022 | Bressan | |
| 2022/0315297 | A1 | 10/2022 | Zirollo | |
| 2022/0332460 | A1 | 10/2022 | Bressan | |
| 2022/0380097 | A1 | 12/2022 | Li | |
| 2023/0015201 | A1 | 1/2023 | Arango | |
| 2023/0110630 | A1 | 4/2023 | Hoefte | |
| 2023/0113321 | A1 | 4/2023 | Bressan | |
| 2023/0132541 | A1 | 5/2023 | Hoefte | |
| 2023/0142224 | A1 | 5/2023 | Buck | |
| 2023/0249870 | A1 | 8/2023 | Huang | |
| 2023/0264852 | A1 | 8/2023 | Hoefte | |
| 2023/0264853 | A1 | 8/2023 | Hoefte | |
| 2023/0286695 | A1 | 9/2023 | Hoefte | |
| 2023/0322455 | A1 | 10/2023 | Beelen | |
| 2023/0415950 | A1 | 12/2023 | Mack et al. | |
| 2024/0017874 | A1 | 1/2024 | Spahlinger | |
| 2024/0025607 | A1 | 1/2024 | Bressan | |
| 2024/0067388 | A1 | 2/2024 | Kavanagh | |
| 2024/0067392 | A1 | 2/2024 | Spahlinger | |
| 2024/0158131 | A1 | 5/2024 | Waddington | |
| 2024/0278968 | A1 | 8/2024 | Thompson | |
| 2024/0327063 | A1 | 10/2024 | Bressan | |
| 2025/0100763 | A1 | 3/2025 | Spahlinger | |
| 2025/0145327 | A1 | 5/2025 | Oliveira | |
| 2025/0153891 | A1 | 5/2025 | Ng Pak Leung | |

FOREIGN PATENT DOCUMENTS

| | | | | |
|---|---|---|---|---|
| CH | 534616 | | 3/1973 | |
| CH | 681293 | | 2/1993 | |
| CH | 710519 | A2 | 6/2016 | |
| CN | 105209590 | | 12/2015 | |
| CN | 109071064 | | 12/2018 | |
| CN | 110817035 | A | 2/2020 | |
| CN | 112498895 | A | 3/2021 | |
| DE | 9214914 | U1 | 1/1993 | |
| DE | 202020106481 | | 2/2022 | |
| DE | 102020129814 | | 5/2022 | |
| EM | 15091757 | | 2/2025 | |
| EP | 0571711 | A2 | 12/1993 | |
| EP | 0679581 | | 11/1995 | |
| EP | 1783058 | A1 | 5/2007 | |
| EP | 1783058 | | 4/2010 | |
| EP | 2594507 | A1 | 5/2013 | |
| EP | 2512938 | B1 | 6/2017 | |
| EP | 3261941 | | 1/2018 | |
| EP | 3587293 | A1 | 1/2020 | |
| EP | 3623308 | A1 | 3/2020 | |
| EP | 3753856 | A1 | 12/2020 | |
| EP | 3 871 989 | | 9/2021 | |
| EP | 3871989 | A1 | 9/2021 | |
| EP | 3978380 | | 4/2022 | |
| EP | 4039606 | A1 | 8/2022 | |
| EP | 4163219 | | 4/2023 | |
| EP | 4245676 | | 9/2023 | |
| EP | 4 269 264 | | 11/2023 | |
| EP | 4269264 | A2 | 11/2023 | |
| FR | 2820718 | A1 | 8/2002 | |
| GB | 385033 | | 12/1932 | |
| GB | 2256425 | A | 12/1992 | |
| GB | 2358391 | | 7/2001 | |
| JP | 52022499 | Y2 | 5/1977 | |
| JP | S5222499 | | 5/1977 | |
| JP | S54142223 | | 10/1979 | |
| JP | H03639 | | 1/1991 | |
| JP | H11049151 | A | 2/1999 | |
| JP | 2002029536 | A | 1/2002 | |
| JP | 2002145256 | A | 5/2002 | |
| JP | 2009161222 | A | 7/2009 | |
| JP | 4536881 | B2 | 9/2010 | |
| JP | 2011140318 | A | 7/2011 | |
| JP | 2011-173640 | A | 9/2011 | |
| JP | 2011-189978 | A | 9/2011 | |
| JP | 2013531589 | | 8/2013 | |
| JP | 2017007691 | A | 1/2017 | |
| JP | 2017131364 | | 8/2017 | |
| JP | 2017-171364 | A | 9/2017 | |
| JP | 2017171364 | | 9/2017 | |
| JP | 2018009176 | | 1/2018 | |
| JP | 6298245 | B2 | 3/2018 | |
| JP | 2018076095 | A | 5/2018 | |
| JP | 3216684 | | 6/2018 | |
| KR | 200310542 | Y1 | 4/2003 | |
| KR | 100906301 | B1 | 7/2009 | |
| NL | 100017 | | 12/1961 | |
| TW | 201444743 | A | 12/2014 | |
| WO | WO 03/101840 | A1 | 12/2003 | |
| WO | 2008038189 | | 4/2008 | |
| WO | 2008054305 | A1 | 5/2008 | |
| WO | 2010015638 | | 2/2010 | |
| WO | 2010085471 | | 7/2010 | |
| WO | 2011012863 | A1 | 2/2011 | |
| WO | 2011154822 | | 12/2011 | |
| WO | 2013076012 | A1 | 5/2013 | |
| WO | 2016138305 | A1 | 9/2016 | |
| WO | 2018022493 | A1 | 2/2018 | |
| WO | 2019094406 | A1 | 5/2019 | |
| WO | 2019236830 | A1 | 12/2019 | |
| WO | WO 2020/052911 | A1 | 3/2020 | |
| WO | 2021013515 | | 1/2021 | |
| WO | 2021044266 | A1 | 3/2021 | |
| WO | WO-2022101339 | A1 * | 5/2022 | B65D 5/38 |
| WO | 2023150283 | A1 | 8/2023 | |
| WO | 2024049779 | A1 | 3/2024 | |

OTHER PUBLICATIONS

International Search Report and Written Opinion for PCT/US2023/027438 dated Nov. 7, 2023, 9 pages.

International Search Report and Written Opinion for PCT/US2023/031 328 dated Dec. 13, 2023, 11 pages.

Strength Packaging I Graphic Packaging International. Date first available: Mar. 31, 2024. Site visited: Mar. 4, 2025. Available online: https://www.graphicpkg.com/solutions/packaging-solutions/strength-packaging/, Year: 2024, (pp. 1-10).

Custom Corrugated Boxes I Flip Top Storage Box I CustomBoxline. Date first available: Sep. 22, 2021. Site visited: Mar. 4, 2025. Available online: https://www.customboxline.com/producUcustom-corrugated-boxes-flip-top-storage-box, Year: 2021, (pp. 1-6).

(56) References Cited

OTHER PUBLICATIONS

12×12×6" Kraft Tab Locking Literature Mailers S-16934—Uline. Date first available: Dec. 1, 2020. Site visited: Mar. 4, 2025. Available online: https://www.uline.com/Product/Detail/S-16934/Indestructo-and-Literature-Mailers/12-x-12-x-6- Kraft-Tab-Locking-Literature-Mailers, Year: 2020, (pp. 1-1).
Office Action (Non-Final Rejection) dated Mar. 9, 2026 for U.S. Appl. No. 18/036,248 (pp. 1-6).
Extended European Search Report issued in App No. EP23750213 dated Nov. 11, 2025, 15 pages.
Office Action (Non-Final Rejection) dated Dec. 23, 2025 for U.S. Appl. No. 18/509,612 (pp. 1-21).
Office Action (Non-Final Rejection) dated Jan. 8, 2026 for U.S. Appl. No. 18/220,881 (pp. 1-7).
GraphicPackaging_Wrap-Style Multipack Cartons, Date Not Available, [online], [site visited Feb. 5, 2026]. Available from internet, URL: htp://www.graphicpg.com/wrap-style-multiack-cartons-forfood-and-beverage-applications/ (Year 2026).
Office Action dated Feb. 19, 2026 for U.S. Appl. No. 29/957,943 (pp. 1-6).
Office Action (Non-Final Rejection) dated Feb. 27, 2026 for U.S. Appl. No. 18/941,443 (pp. 1-17).
Office Action (Non-Final Rejection) dated Mar. 25, 2026 for U.S. Appl. No. 18/728,966 (pp. 1-32).

* cited by examiner

CARTON WITH LOCKING FEATURES

CROSS-REFERENCE TO RELATED APPLICATIONS

This application claims the benefit of German Utility Model Application No. 202022103827.9, filed on Jul. 7, 2022.

INCORPORATION BY REFERENCE

The disclosure of German Utility Model Application No. 202022103827.9, which was filed on Jul. 7, 2022, is hereby incorporated by reference for all purposes as if presented herein in its entirety.

BACKGROUND OF THE DISCLOSURE

The present disclosure generally relates to cartons/boxes for holding one or more products. More specifically, the present disclosure relates to a carton with an inner construct at least partially received within an outer construct and with locking features for selectively limiting and/or resisting relative movement between the constructs of the carton.

Cartons/boxes with locking features can be used for a wide variety of different products, such as dishwashing agents, medicines, household cleaners, candles, cosmetics, tobacco, and other products that should be kept out of the hands of children, as they may put the products in their mouths, swallow them, or use them in other dangerous ways. In examples, one may want to keep certain products out of the reach of infants, toddlers, kindergarten children, and children of preschool age, i.e., up to about the age of six, for example.

SUMMARY OF THE DISCLOSURE

In general, one aspect of the disclosure is directed to a carton, comprising an inner construct comprising a plurality of inner panels extending at least partially around a first interior of the inner construct. The inner construct can comprise an inner locking tab foldably connected to at least one inner panel of the plurality of inner panels. The carton further can comprise an outer construct comprising a plurality of outer panels extending at least partially around a second interior of the outer construct. The inner construct can be at least partially received in the second interior of the outer construct. The outer construct can comprise an outer locking tab foldably connected to at least one outer panel of the plurality of outer panels, and the inner locking tab and the outer locking tab can cooperate to limit movement between the inner construct and the outer construct. The carton also can comprise an engagement feature extending in the at least one outer panel of the outer construct. The engagement feature can comprise a cover panel that is at least partially separable from the at least one outer panel for forming an engagement hole in the at least one outer panel. The inner locking tab of the inner construct can extend along the engagement feature in the outer construct so that the inner locking tab can be engaged via the engagement hole when the cover panel is at least partially removed for moving the inner locking tab with respect to the outer locking tab for facilitating movement of the inner construct and the outer construct relative to one another from a closed configuration to an open configuration.

In another aspect, the disclosure is generally directed to, in combination, a first blank and a second blank for cooperating to at least partially form a carton. The first blank can include a plurality of inner panels and an inner locking tab foldably connected to at least one inner panel of the plurality of inner panels. The first blank can be for forming an inner construct. The second blank can include a plurality of outer panels and an outer locking tab foldably connected to at least one outer panel of the plurality of outer panels. The second blank can be for forming an outer construct for at least partially receiving the inner construct formed from the first blank when the carton is formed from the first blank and the second blank, and the inner locking tab and the outer locking tab can be configured for selectively cooperating to limit movement between the inner construct formed from the first blank and the outer construct formed from the second blank when the carton is formed from the first blank and the second blank. An engagement feature can extend in the at least one outer panel of the second blank, the engagement feature comprising a cover panel that is at least partially separable from the at least one outer panel for forming an engagement hole in the at least one outer panel. The engagement feature can be for facilitating engagement of the inner locking tab for moving the inner locking tab with respect to the outer locking tab when the carton is formed from the first blank and the second blank.

In another aspect, the disclosure is generally directed to a method of forming a carton. The method can include obtaining a first blank comprising a plurality of inner panels and an inner locking tab foldably connected to at least one inner panel of the plurality of inner panels, forming an inner construct from the first blank by folding the plurality of inner panels at least partially around a first interior of the inner construct, and obtaining a second blank comprising a plurality of outer panels and an outer locking tab foldably connected to at least one outer panel of the plurality of outer panels. An engagement feature can extend in the at least one outer panel, and the engagement feature can comprise a cover panel that is at least partially separable from the at least one outer panel for forming an engagement hole in the at least one outer panel. The method further can comprise forming an outer construct from the second blank by folding the plurality of outer panels at least partially around a second interior of the outer construct and moving at least one of the inner construct and the outer construct relative to the other to assemble the carton with the inner construct at least partially received in the second interior of the outer construct. The inner locking tab and the outer locking tab can cooperate to limit movement between the inner construct and the outer construct, and the inner locking tab of the inner construct extends along the engagement feature in the outer construct so that the inner locking tab can be engaged via the engagement hole when the cover panel is at least partially removed for moving the inner locking tab with respect to the outer locking tab for facilitating movement of the inner construct and the outer construct relative to one another from a closed configuration to an open configuration.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure generally relates to constructs, boxes, cartons, carriers, trays, or the like, and packages for holding one or more products or articles such as those that should be kept out of the hands of children (e.g., for safety reasons). The product or products can be cleaning products such as dishwashing agents, household cleaners, soaps, and the like; medicines; cosmetics; candles; tobacco; objects that may pose a choking hazard; any other suitable product or material; or combinations thereof.

Constructs according to the present disclosure can accommodate product or articles of any shape. In this specification, the terms “inner,” “interior,” “outer,” “exterior,” “lower,” “bottom,” “upper,” and “top” indicate orientations determined in relation to fully erected and upright constructs and cartons. As described herein, constructs can be formed from blanks by being glued with multiple panels, portions, tabs, and/or flaps, which may be designated herein in terms relative to one another, e.g., “first”, “second”, “third”, etc., in sequential or nonsequential reference, without departing from the disclosure.

Figure 1:
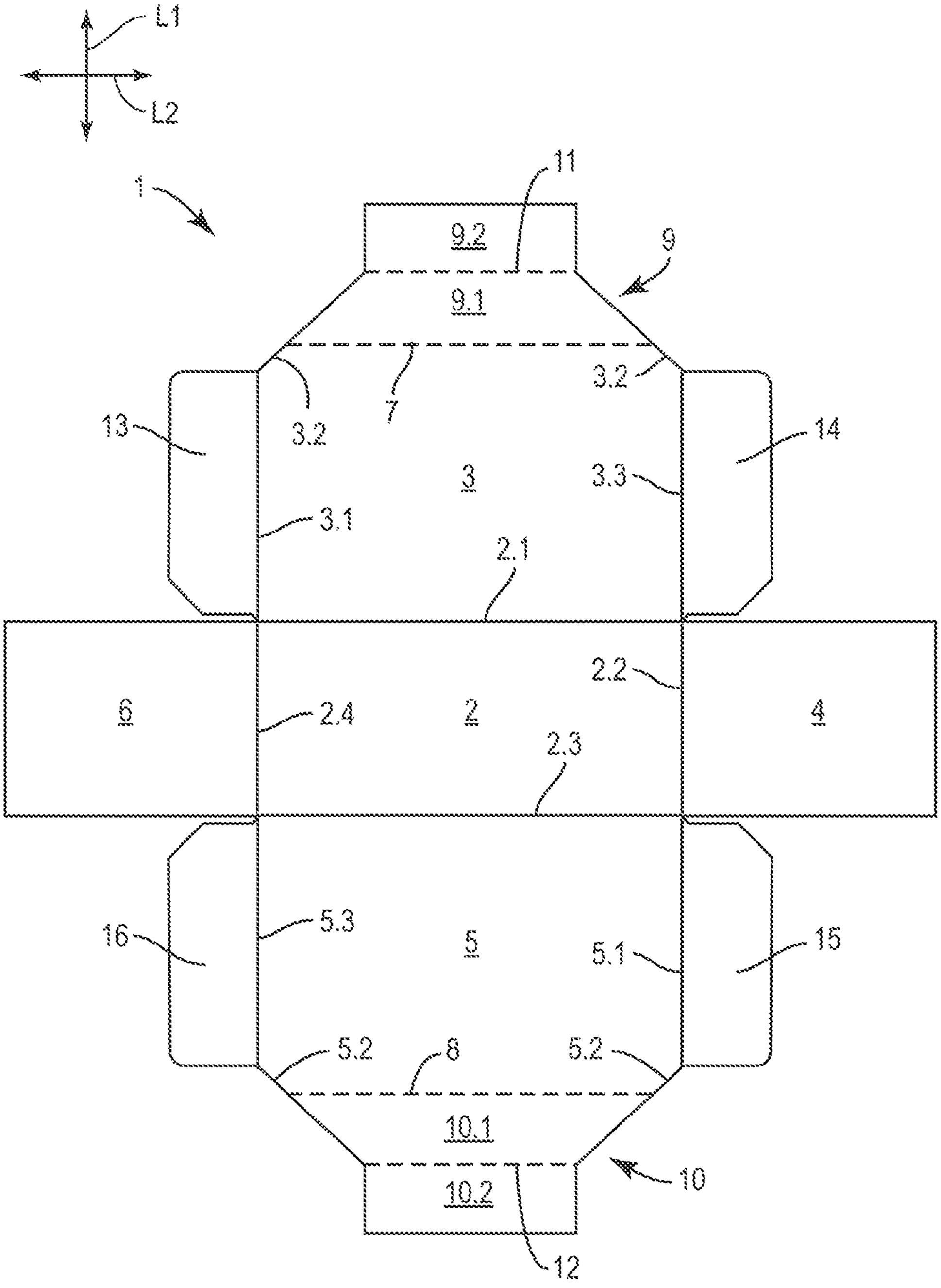
FIG. 1 is a plan view of a first blank for forming an inner construct according to exemplary embodiments of the disclosure.

According to FIG. 1, a first blank 1 is used to form an inner part or inner construct 17 (FIGS. 2 and 5A-7B) with a first opening 18 according to exemplary embodiments of the disclosure. The inner construct 17 can be a container used to hold one or more products (not shown). FIG. 3 illustrates a second blank 21 used to form an outer part or outer construct 49 (e.g., a cover 49) (FIGS. 4-7B) with a second opening 52 according to exemplary embodiments of the disclosure. In embodiments, the inner (interior) construct 17 and the outer (exterior) construct 49 cooperate to form a carton 55 (FIGS. 6 and 7) with the outer construct 49 extending at least partially around the inner construct 17 and the inner construct being selectively movable within the outer construct between a closed configuration or first position (FIGS. 6-7B) and an open configuration or second position (FIGS. 5A and 5B), as described in more detail below. In the illustrated embodiments, the inner construct 17 and the outer construct 49 can include locking and stop features for cooperating to resist and/or limit movement of the inner construct 17 relative to the outer construct 49, as described in more detail below. In exemplary embodiments, the blanks 1, 21 can be made of paperboard, cardboard, corrugated cardboard, or other suitable material.

As shown in FIG. 1, the first blank 1 has a longitudinal direction L1 and a lateral direction L2. In the illustrated embodiment, the first blank 1 can have a bottom wall or panel 2 that is foldably connected at its edges to four first side walls or inner panels 3, 4, 5, 6 along respective fold lines 2.1, 2.2, 2.3, 2.4. For example, the bottom panel 2 can be foldably connected to the respective first inner side panel 3 and second inner side panel 5 along respective lateral fold lines 2.1, 2.3, and the bottom panel 2 can be foldably connected to the respective first inner end panel 4 and second inner end panel 6 along respective longitudinal fold lines 2.2, 2.4. As shown in FIG. 1, at least the bottom panel 2 and the inner end panels 4, 6 can be rectangular. Any of the bottom panel 2 and/or the inner panels 3, 4, 5, 6 could be omitted or could be otherwise shaped, arranged, and/or configured without departing from the disclosure.

In the illustrated embodiments, the inner side panels 3, 5 can be foldably connected to respective first or inner locking tabs 9, 10 along respective lateral fold lines 7, 8 at opposing edges of the inner side panels 3, 5. As shown in FIG. 1, each of the inner locking tabs 9, 10 can include a respective proximal section 9.1, 10.1 (e.g., an inner or first proximal section) and a respective distal section 9.2, 10.2 (e.g., an inner or first distal section). In embodiments, the proximal sections 9.1, 10.1 are foldably connected (e.g., directly foldably connected) to the respective inner side panels 3, 5 along the respective lateral fold lines 7, 8 and are foldably connected to the respective distal sections 9.2, 10.2 along respective lateral fold lines 11, 12. In the illustrated embodiments, the proximal sections 9.1, 10.1 can be trapezoidal (e.g., so that the fold lines 11, 12 are shorter than the fold lines 7, 8 and the free edges of the proximal sections 9.1, 10.1 are oblique) and the distal sections 9.2, 10.2 can be rectangular. Alternatively, the sections 9.1, 9.2, 10.1, 10.2 could have any suitable shape.

As shown in FIG. 1, the first inner side panel 3 is foldably connected to respective inner dust flaps or inner side end flaps 13, 14 along respective longitudinal fold lines 3.1, 3.3. Similarly, the second inner side panel 5 is foldably connected to respective inner dust flaps or inner side end flaps 15, 16 along respective longitudinal fold lines 5.1, 5.3. In embodiments, the longitudinal fold lines 3.1, 3.3 and 5.1, 5.3 can extend along rectangular sections of the respective inner side panels 3, 5. Further, oblique free edges 3.2, 5.2 of the respective inner side panels 3, 5 can extend from the respective longitudinal fold lines 3.1, 3.3 and 5.1, 5.3 to respective ends of the respective lateral fold lines 7, 8 to at least partially define respective trapezoidal sections of the respective inner side panels 3, 5. In the illustrated embodiments, each of the free edges of the proximal sections 9.1, 10.1 of the inner locking tabs 9, 10 can extend as a continuation of the respective oblique free edges 3.2, 5.2 of the inner side panels 3, 5. Any of the inner locking tabs 9, 10, the inner side end flaps 13, 14, 15, 16, and/or the inner side panels 3, 5 could be omitted or could be otherwise shaped, arranged, and/or configured without departing from the disclosure.

The blank 1 could be otherwise shaped, arranged, and/or configured without departing from the disclosure.

In a first processing step for forming the inner construct 17 (FIGS. 2, 5A, and 5B) from the first blank 1, the distal sections 9.2, 10.2 of the inner locking tabs 9, 10 can be folded against and secured (e.g., adhesively bonded) to the outer sides of the respective proximal sections 9.1, 10.1 of the inner locking tabs 9, 10, and the proximal sections 9.1, 10.1 can be folded against and secured (e.g., adhesively bonded) to the outer sides of the respective inner side panels 3, 5. In embodiments, the distal sections 9.2, 10.2 can be secured between the respective proximal portions 9.1, 10.1 and the respective inner side panels 3, 5. Alternatively, the proximal portions 9.1, 10.1 can be disposed between the respective inner side panels 3, 5 and the respective distal sections 9.2, 10.2. In exemplary embodiments, the locking tabs 9, 10 can be folded and glued to the respective inner side panels 3, 5 (e.g., by a manufacturer of the packaging) and then stored and/or transported (e.g., to a packer) in a flat, glued blank configuration (not shown), such as in stacks with other similar or identical blanks.

Figure 2:
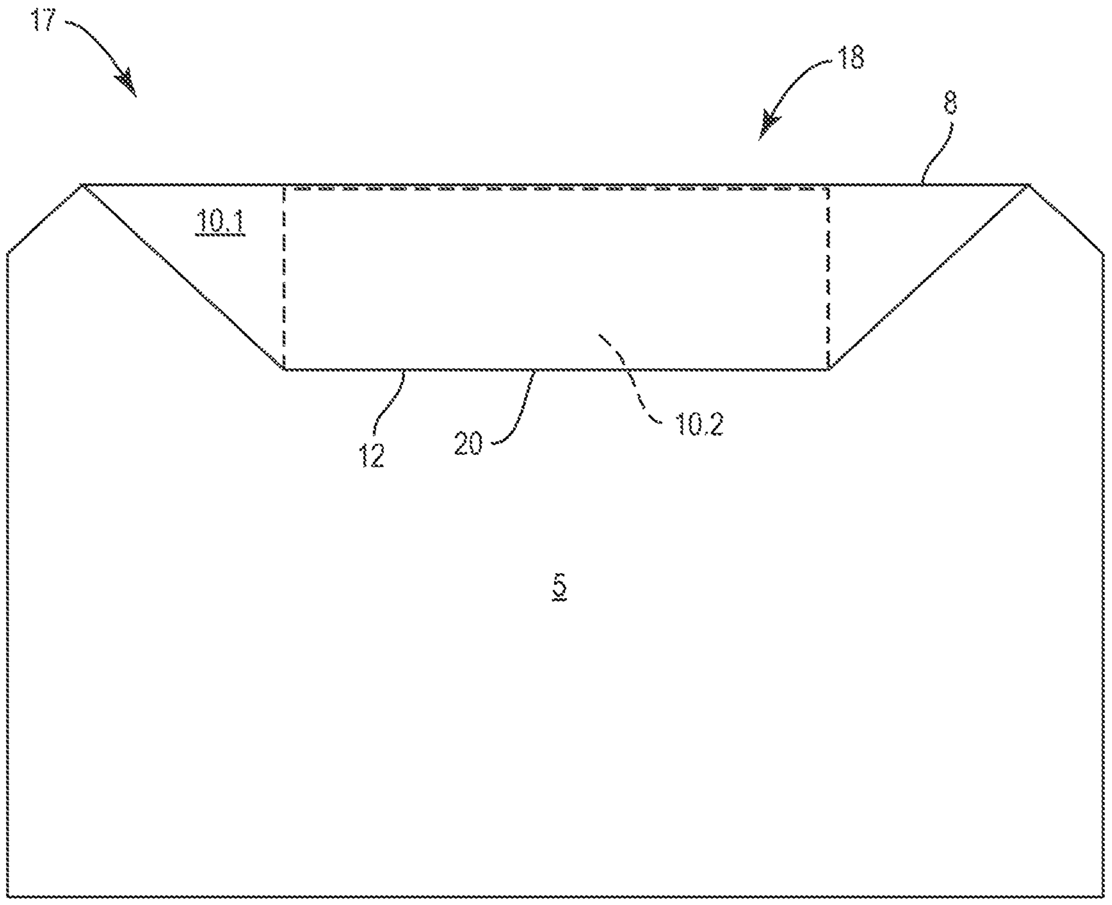
FIG. 2 is a side view of the inner construct formed from the first blank of FIG. 1 according to exemplary embodiments of the disclosure.
Figure 3:
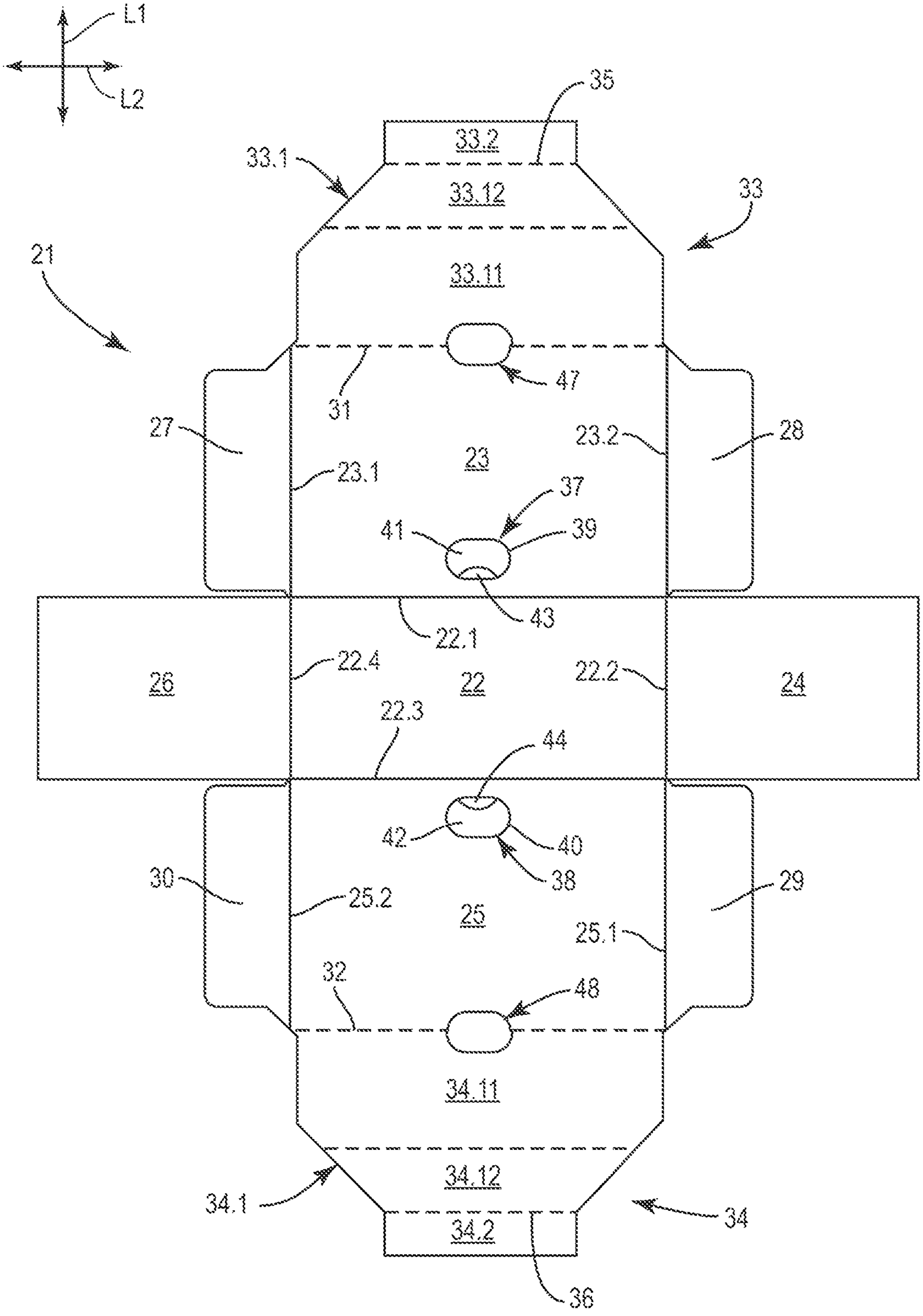
FIG. 3 is a plan view of a second blank for forming an outer construct according to exemplary embodiments of the disclosure.
Figure 5A:
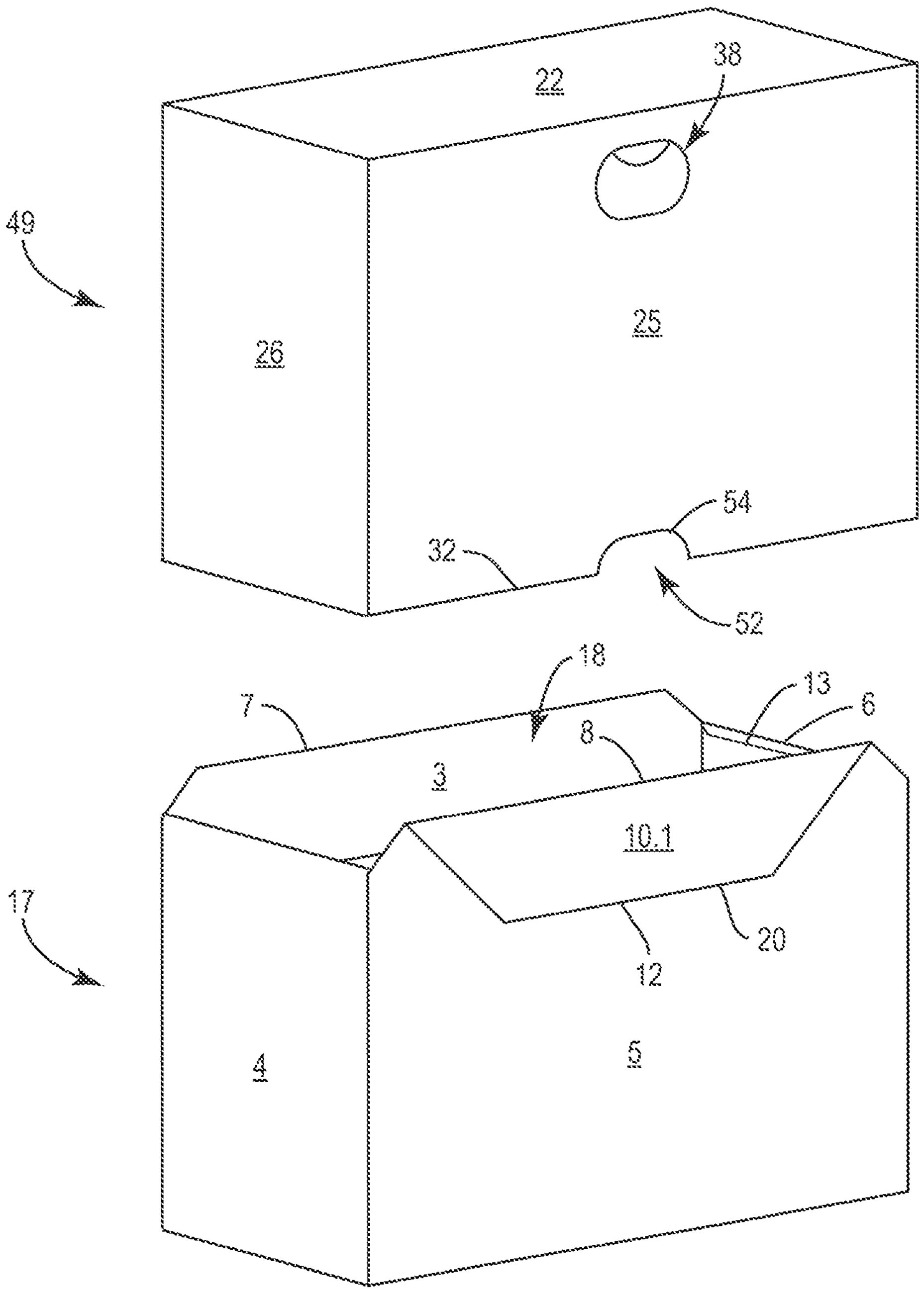
FIG. 5A is a perspective view of the inner construct of FIG. 2 and the outer construct of FIG. 4 arranged relative to one another for moving the outer construct onto the inner construct and/or after removing the inner construct from the outer construct according to exemplary embodiments of the disclosure.
Figure 5B:
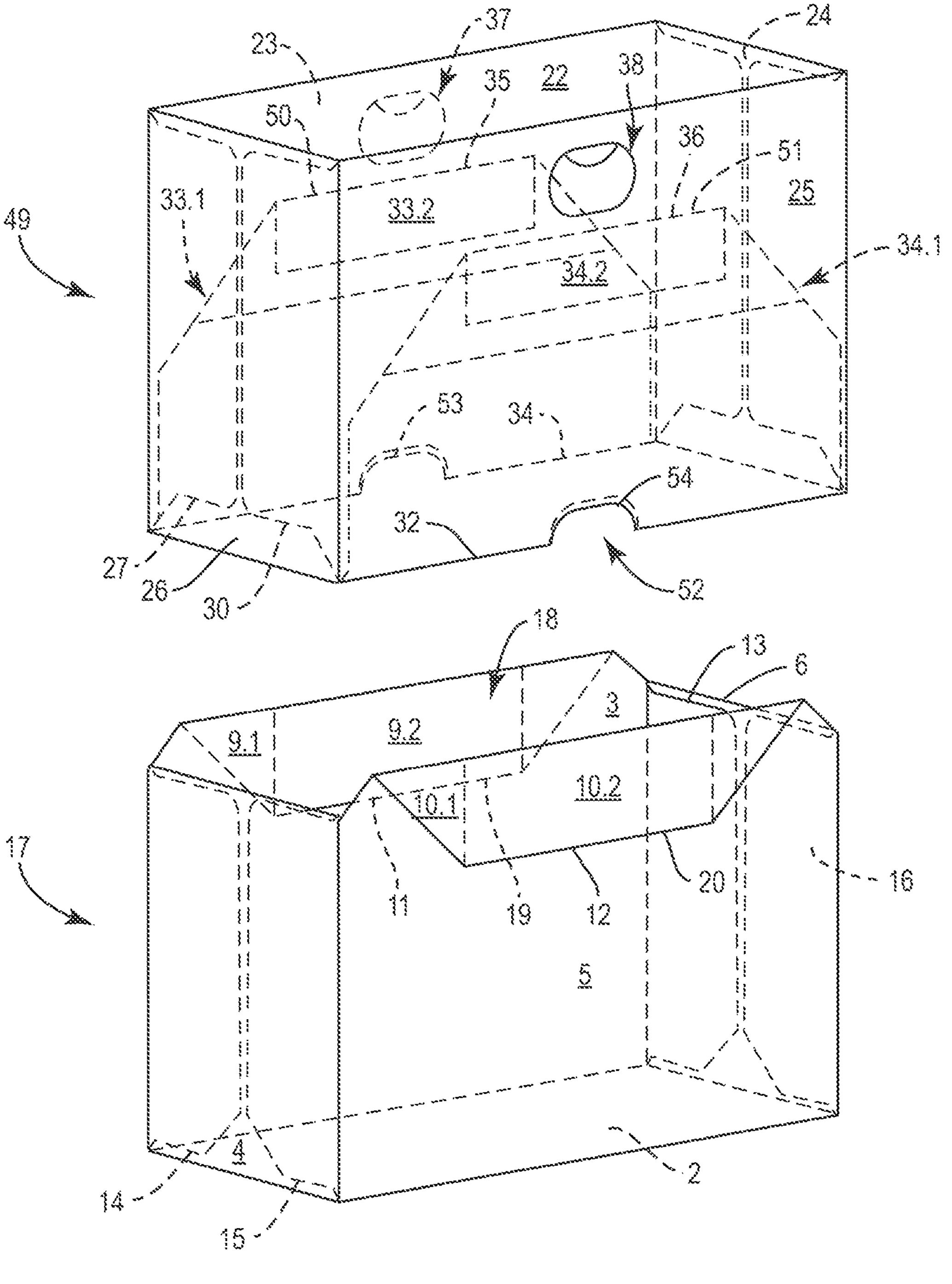
FIG. 5B is a perspective view of the inner construct and the outer construct as arranged in FIG. 5A showing the hidden features of the inner construct and the outer construct in broken lines according to exemplary embodiments of the disclosure.

As shown in FIGS. 2, 5A, and 5B, the erected inner construct 17 can be formed from the flat, glued blank (e.g., by a folder-gluer system, a packer, etc.) by folding the inner side panels 3, 5 along the lateral fold lines 2.1, 2.3 to extend upwardly from the bottom panel 2, folding the inner end flaps 13, 16 and 14, 15 along the respective longitudinal fold lines 3.1, 5.3 and 3.3, 5.1 over the respective ends of the inner construct 17, and folding the inner end panels 6, 4 along the respective longitudinal fold lines 2.4, 2.2 over the respective ends of the inner construct 17. In the illustrated embodiments, the inner side end flaps 13, 14, 15, 16 can be folded to extend between the inner side panels 3, 5, perpendicular to the inner side panels 3, 5. In embodiments, the first inner end panel 4 can overlap and can be secured (e.g., adhered) to the inner side end flaps 14, 15 to form a first inner end wall, and the second inner end panel 6 can overlap and can be secured (e.g., adhered) to the inner side end flaps 13, 16 to form a second inner end wall. As shown in FIGS. 2, 5A, and 5B, the bottom panel 2, the inner panels 3, 4, 5, 6, and the inner end flaps 13, 14, 15, 16 can extend at least partially around a first interior of the inner construct 17 for receiving items in the inner construct 17. In the illustrated embodiments, erected inner construct 17 can have a first or inner opening 18 defined between the inner panels 3, 4, 5, 6 in relation to the bottom panel 2 (e.g., for inserting products into and removing products from the inner construct 17). As shown in FIGS. 2, 5A, and 5B, the folded inner locking tabs 9, 10 form first or inner locking edges 19, 20 along the respective lateral fold lines 11, 12. In the illustrated embodiments, the first locking edges 19, 20 can face away from the inner opening 18 and toward the bottom panel 2 and can be spaced apart from the inner opening 18 and the bottom panel 2. The inner construct 17 could be otherwise formed without departing from the disclosure.

As shown in FIG. 3, the second blank 21 for the outer part/construct 49 can have a longitudinal direction L1 and a lateral direction L2. In the illustrated embodiment, the second blank 21 can include a top wall or panel 22 that is foldably connected at its edges to four second side walls or outer panels 23, 24, 25, 26 along respective fold lines 22.1, 22.2, 22.3, 22.4. For example, the top panel 22 can be foldably connected to the respective first outer side panel 23 and second outer side panel 25 along respective lateral fold lines 22.1, 22.3, and the top panel 22 can be foldably connected to the respective first outer end panel 24 and second outer end panel 26 along respective longitudinal fold lines 22.2, 22.4. In embodiments, each of the top wall 22 and the outer panels 23, 24, 25, 26 can be rectangular. Any of the top panel 22 and/or the outer panels 23, 24, 25, 26 could be omitted or could be otherwise shaped, arranged, and/or configured without departing from the disclosure.

In the illustrated embodiments, the first outer side panel 23 can be foldably connected to respective outer dust flaps or outer side end flaps 27, 28 along respective longitudinal fold lines 23.1, 23.2. Similarly, the second outer side panel 25 can be foldably connected to respective outer dust flaps or outer side end flaps 29, 30 along respective longitudinal fold lines 25.1, 25.2. Any of the outer side end flaps 27, 28, 29, 30 and/or the outer side panels 23, 25 could be omitted or could be otherwise shaped, arranged, and/or configured without departing from the disclosure.

As shown in FIG. 3, the outer side panels 23, 25 can be foldably connected to respective second or outer locking tabs 33, 34 along respective lateral fold lines 31, 32 at opposing edges of the outer side panels 23, 25. In the illustrated embodiments, each of the outer locking tabs 33, 34 can include a respective proximal section 33.1, 34.1 (e.g., an outer or second proximal section) and a respective distal section 33.2, 34.2 (e.g., an outer or second distal section). In embodiments, the proximal sections 33.1, 34.1 are foldably connected (e.g., directly foldably connected) to the respective outer side panels 23, 25 along the respective lateral fold lines 31, 32 and are foldably connected to the respective distal sections 33.2, 34.2 along respective lateral fold lines 35, 36, which are opposite to the respective lateral fold lines 31, 32. In exemplary embodiments, each of the proximal sections 33.1, 34.1 can have two portions, wherein the first portions 33.11, 34.11 adjoin the respective lateral fold lines 31, 32 and can be rectangular (e.g., can be defined by free edges extending in the longitudinal direction L1). In embodiments, the second portions 33.12, 34.12 adjoin the respective lateral fold lines 35, 36 and are trapezoidal (e.g., can be defined by free edges that are oblique), wherein the respective second portions 33.12, 34.12 widen toward the respective first portions 33.11, 34.11. In exemplary embodiments, the distal sections 33.2, 34.2 can be rectangular and can be foldably connected to the short edges of the proximal sections 33.1, 34.1 along the lateral fold lines 35, 36. Alternatively, the sections 33.1, 33.2, 34.1, 34.2 could have any suitable shape.

In the illustrated embodiments, the second blank 21 can include engagement devices or features 37, 38 extending in the respective outer side panels 23, 25. As shown in FIG. 3, the engagement devices 37, 38 can be positioned closer to the top panel 22 than to the respective outer locking tabs 33, 34 and can have an oval shape. In embodiments, the engagement devices 37, 38 can include respective weakening lines 39, 40 (e.g., cut or tear lines) that at least partially define respective engagement covers or cover panels 41, 42. In exemplary embodiments, the weakening lines 39, 40 can be formed by mutually offset scribe lines in the outer surfaces and inner surfaces of the outer side panels 23, 24. As shown in FIG. 3, the engagement devices 37, 38 can include respective access openings 43, 44 (e.g., having a lens shape) extending along an edge of the respective weakening lines 39, 40 (e.g., proximate to the top panel 22). Alternatively, the access openings 43, 44 could be positioned along any portion of the respective cover panels 41, 42 or could be omitted. In embodiments, the covers 41, 42 can be removed by tearing along the weakening lines 39, 40 to form respective engagement holes 45, 46 (FIGS. 7A and 7B) in the respective outer side panels 23, 25. In some embodiments, the engagement devices 37, 38 can include fold lines (not shown), wherein the respective weakening lines 39, 40 extend from the ends of the respective fold lines, so that the covers 41, 42 are partially removed from the respective outer panels 23, 25 along the respective weakening lines 39, 40 and folded outwardly along the respective fold lines (not shown).

As shown in FIG. 3, the second blank 21 further can include engagement openings 47, 48 (e.g., in the shape of an oval). In embodiments, the opening 47 can extend in the first outer side panel 23 and the proximal portion 33.1 of the first outer locking tab 33 (e.g., with half in the outer side panel 23 and half in the proximal portion 33.1 arranged symmetrically with respect to the lateral fold line 31). Further, the engagement opening 48 extending in the second outer side panel 25 and the proximal portion 34.1 of the second outer locking tab 34 (e.g., with half in the outer side panel 25 and half in the proximal portion 34.1 arranged symmetrically with respect to the lateral fold line 32). Any of the engagement features 37, 38, 47, 48 could be omitted or could be otherwise shaped, arranged, and/or configured without departing from the disclosure. For example, the engagement features could have any suitable shape. In another example, the covers 41, 42 could be omitted so that the engagement features 37, 38 are openings in the outer side panels 23, 25. Further, at least partially removable panels (not shown) (e.g., similar to the cover panels 41, 42) can be included in the first blank 1 and can be removed by tearing along weakening lines (not shown) (e.g., similar to the weakening lines 39, 40) to form the engagement openings 47, 48.

Figure 4:
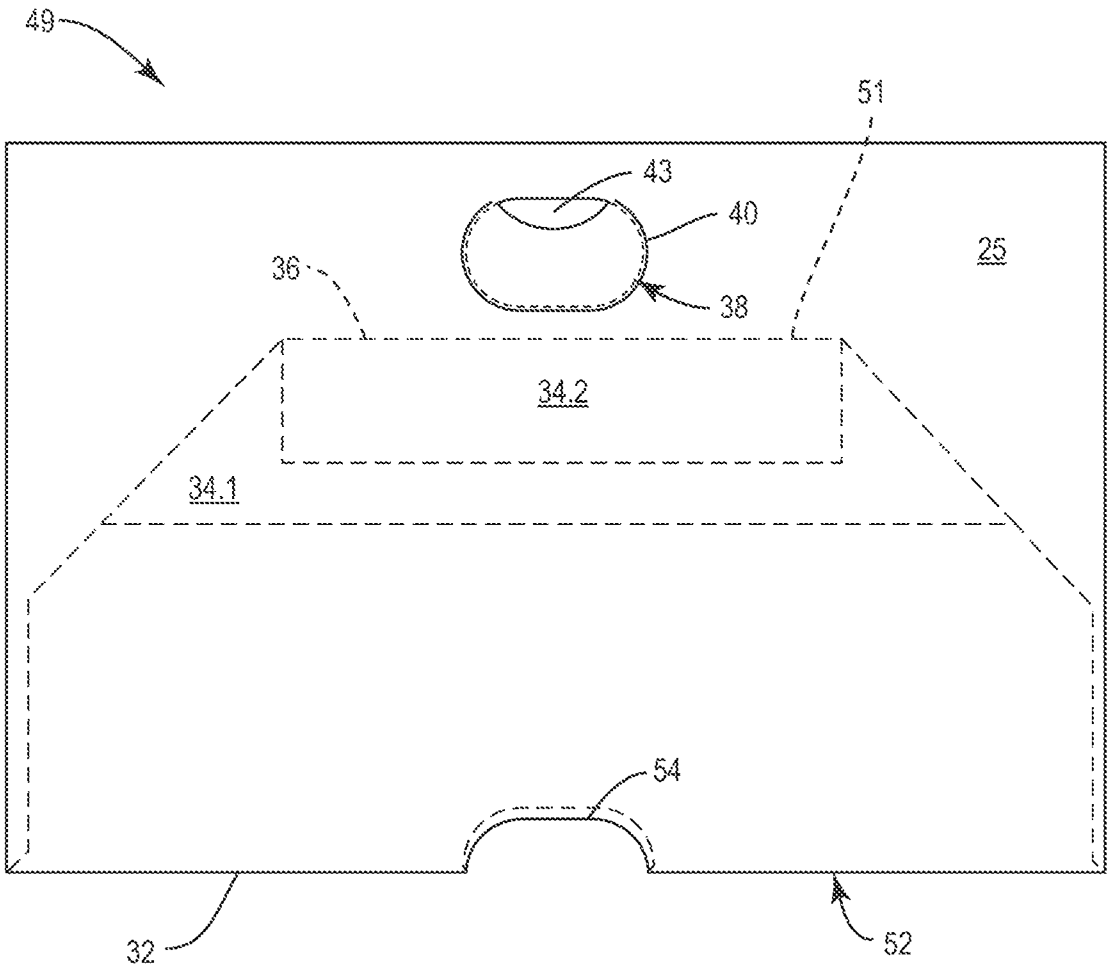
FIG. 4 is a side view of the outer construct formed from the second blank of FIG. 3 according to exemplary embodiments of the disclosure.

In a first processing step for forming the outer construct 49 (FIGS. 4-7B) from the second blank 21, the distal sections 33.2, 34.2 of the outer locking tabs 33, 34 can be folded against and secured (e.g., adhesively bonded) to the inner sides of the respective proximal sections 33.1, 34.1 of the outer locking tabs 33, 34. Further, the outer proximal sections 33.1, 34.1 can be folded against the inner sides of the respective outer side panels 23, 25 and the distal sections 33.2, 34.2 can be secured (e.g., adhesively bonded) to the inner sides of the outer side panels 23, 25. Accordingly, the distal sections 33.2, 34.2 can be secured between the respective proximal portions 33.1, 34.1 and the respective outer side panels 23, 25. Alternatively, the proximal portions 33.1, 34.1 can be disposed between the respective outer side panels 23, 25 and the respective distal sections 33.2, 34.2 and secured to the outer side panels 23, 25. In the illustrated embodiments, the folded outer locking tabs 33, 34 can form second or outer locking edges 50, 51 along the respective lateral fold lines 35, 36 and positioned between the engagement devices 37, 38 and the respective lateral fold lines 31, 32 (FIGS. 4 and 5B). As shown in FIGS. 4-7B, the engagement openings 47, 48 are formed into respective engagement recesses or cutouts 53, 54 in the outer construct 49 when the outer locking tabs 33, 34 are folded against the inner sides of the outer side panels 23, 25. In embodiments, the engagement recesses 53, 54 can have the shape of half an oval and can extend along the lower edges of the outer side panels 23, 25. In exemplary embodiments, the outer locking tabs 33, 34 can be folded and glued to the respective outer side panels 23, 25 (e.g., by a packaging manufacturer) and then stored and/or transported (e.g., to a packer) in a flat, glued blank configuration (not shown), such as in stacks with other similar or identical blanks and/or with the first blanks 1.

As shown in FIGS. 4-7B, the erected outer construct 49 can be formed from the flat, glued blank (e.g., by a folder-gluer system, a packer, etc.) by folding the outer side panels 23, 25 along the lateral fold lines 22.1, 22.3 to extend downwardly from the top panel 22, folding the outer end flaps 27, 30 and 28, 29 along the respective longitudinal fold lines 23.1, 25.2 and 23.2, 25.1 over the respective ends of the outer construct 49, and folding the outer end panels 26, 24 along the respective longitudinal fold lines 22.4, 22.2 over the respective ends of the outer construct 49. In the illustrated embodiments, the outer side end flaps 27, 28, 29, 30 can be folded to extend between the outer side panels 23, 25, perpendicular to the outer side panels 23, 25. In embodiments, the first outer end panel 24 can overlap and can be secured (e.g., adhered) to the outer side end flaps 28, 29 to form a first outer end wall, and the second outer end panel 26 can overlap and can be secured (e.g., adhered) to the outer side end flaps 27, 30 to form a second outer end wall. As shown in FIGS. 4-7B, the top panel 22, the outer panels 23, 24, 25, 26, and the outer end flaps 27, 28, 29, 30 can extend at least partially around a second interior of the outer construct 49, wherein the inner construct 17 is at least partially received in the second interior of the outer construct 49 when the carton 55 is in its closed configuration. In the illustrated embodiments, erected outer construct 49 can have a second or outer opening 52, and the inner construct 17 can be movable into and out of the second interior of the outer construct 49 through the second opening when the locking tabs are disengaged from one another as described in more detail below. As shown in FIGS. 4 and 5B, the second locking edges 50, 51 can face away from the outer opening 52 and toward the top panel 22 and can be spaced apart from the outer opening 52 and the top panel 22. The outer construct 49 could be otherwise formed without departing from the disclosure.

Figure 6:
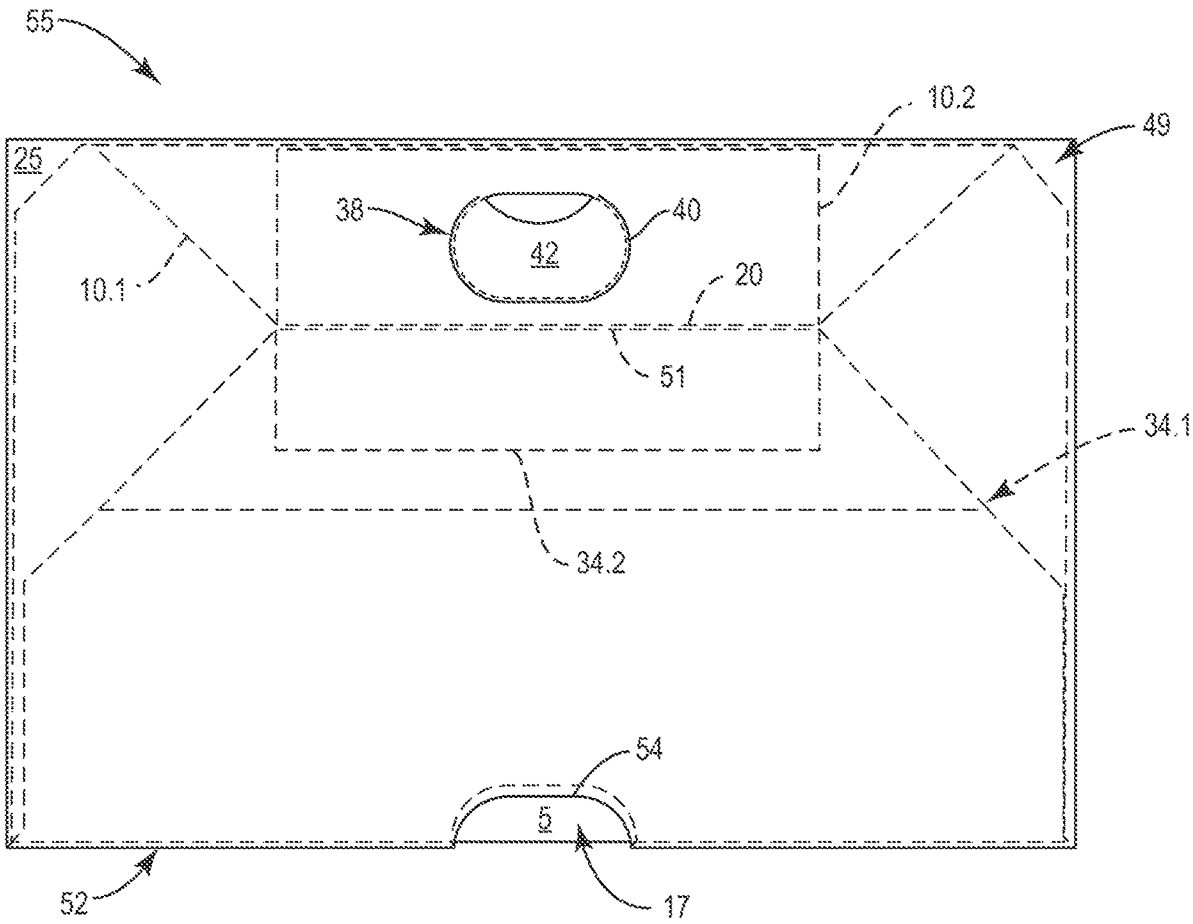
FIG. 6 is a side view of the carton formed by assembling the inner construct and the outer construct of FIGS. 5A and 5B showing the engaged locking tabs of the constructs in broken lines according to exemplary embodiments of the disclosure.
Figure 7A:
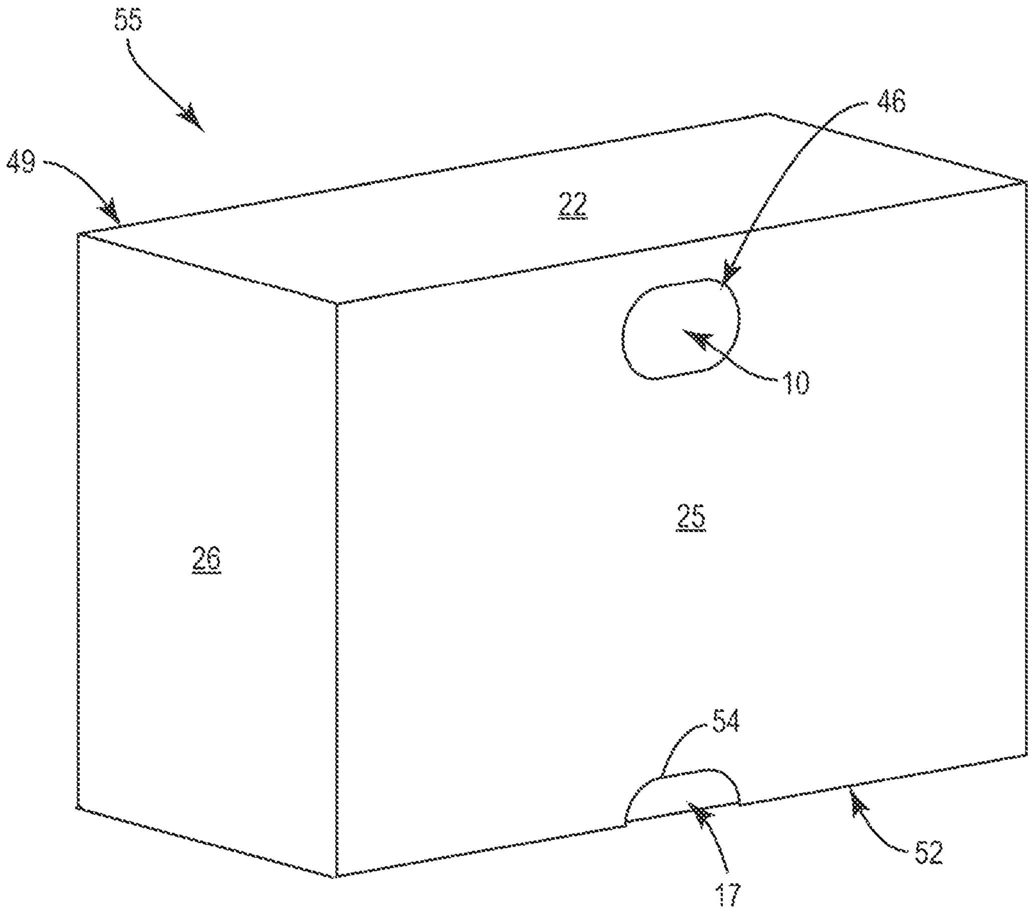
FIG. 7A is a perspective view of the carton of FIG. 6.
Figure 7B:
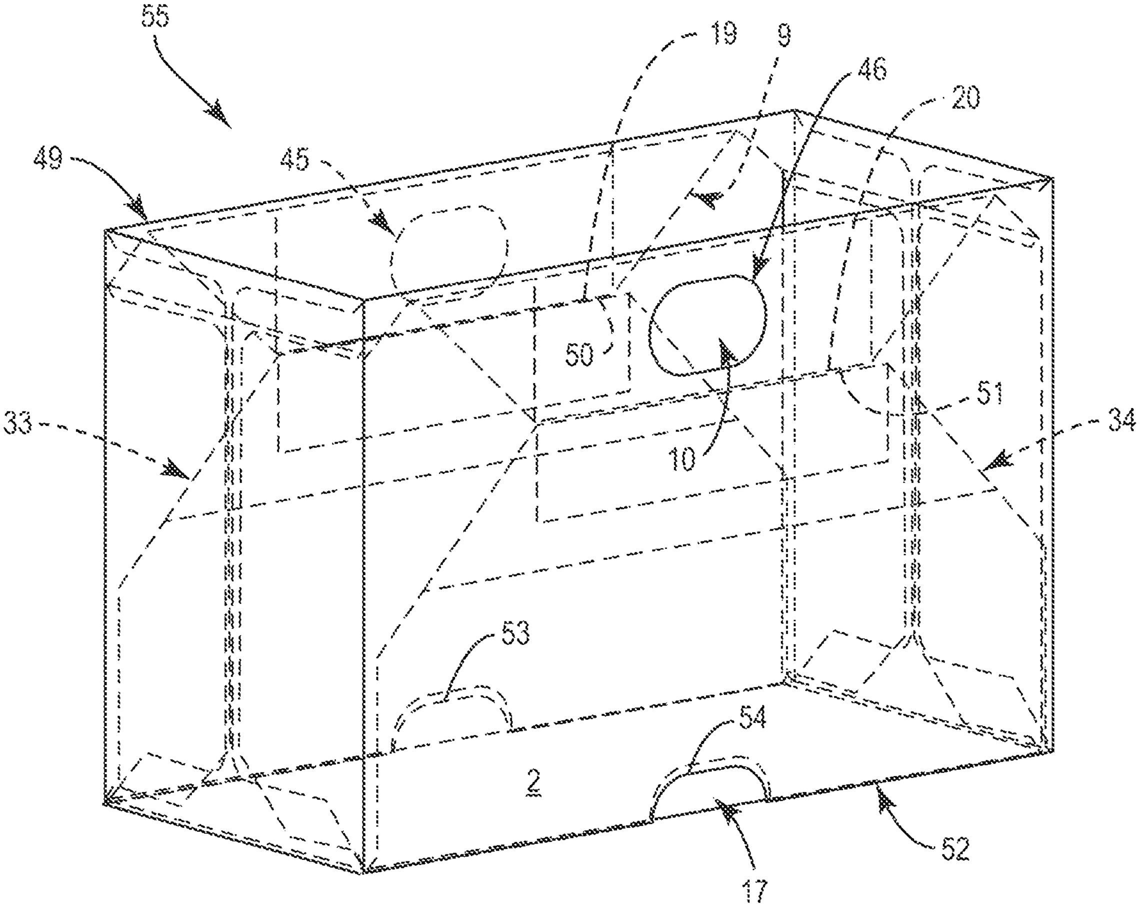
FIG. 7B is a perspective view of the carton of FIGS. 6 and 7A showing the hidden features of the inner construct and the outer construct in broken lines according to exemplary embodiments of the disclosure.

FIGS. 5A and 5B show the constructs 17, 49 in a separated or open configuration (e.g., so that the first opening 18 of the inner construct 17 is accessible for loading and/or removing items from the inner construct 17). In the illustrated embodiments, the second opening 52 of the outer construct 49 is aligned with the first opening 18 of the inner construct 17 in preparation for assembling the carton 55 in its closed configuration (FIGS. 6-7B). In embodiments, FIGS. 5B, 6, and 7B show the internal or otherwise hidden aspects of the constructs 17, 49 in broken lines. When the outer construct 49 is moved onto the inner construct 17 to assemble the carton 55 in its closed configuration, the second locking edges 50, 51 of the outer construct 49 move past the first locking edges 19, 20 of the inner construct so that the second locking edges 50, 51 are arranged below the first locking edges 19, 20 (FIGS. 6 and 7B). As shown in FIGS. 6 and 7B, when the carton 55 is in its closed configuration, the inner locking edges 19, 20 face away from the top panel 22 of the outer construct 49 and are spaced apart from the top panel 22 and the outer locking edges 50, 51 face away from the bottom panel 2 of the inner construct 17 and are spaced apart from the bottom panel 22. In embodiments, the carton 55 could be assembled by moving the outer construct 49 onto the inner construct 17, moving the inner construct 17 into the outer construct 49, or moving both constructs 17, 49 together.

In the illustrated embodiments, the carton 55 can be locked in its closed configuration (e.g., due to the position of the second locking edges 50, 51 below the first locking edges 19, 20). For example, the second locking edges 50, 51 can face the first locking edges 19, 20 and so that attempting to move the constructs 17, 49 relative to one another can cause the first locking edges 19, 20 and the respective outer locking edges 50, 51 to engage (e.g., contact, abut, interact, etc.). In embodiments, the abutment of the first locking edges 19, 20 against the respective second locking edges 50, 51 can limit or prevent relative movement between the constructs 17, 49 to limit or prevent undesired extraction of the inner construct 17 from the opening 52 of the outer construct 49. Accordingly, in embodiments, the inner locking tabs 9, 10 can engage the respective outer locking tabs 33, 34 (e.g., along the respective locking edges 19, 20 and 50, 51) so that the locking tabs 9, 10, 33, 34 cooperate to limit movement of the inner construct 17 relative to the outer construct 49. The carton 55 could be otherwise formed and/or erected without departing from the disclosure.

In exemplary embodiments, the carton 55 can be manipulated to overcome the locking engagement of the inner locking tabs 9, 10 with the outer locking tabs 33, 34 so that the inner construct 17 can be moved from the first (e.g., closed) position (e.g., wherein the inner construct 17 is partially or fully contained within the outer construct 49 with the first opening 18 covered by the outer construct 49) to the second (e.g., open) position (e.g., wherein the inner construct 17 is removed from the outer construct 17 through the opening 52 so that the first opening 18 is accessible). For example, the covers 41, 42 of the engagement devices 37, 38 are separated from the respective outer side panels 23, 25 along the respective weakening lines 39, 40 (e.g., by grasping the covers 41, 42 at the access openings 43, 44). In embodiments, the removal of the covers 41, 42 can provide a first opening protection for the carton 55. In the illustrated embodiments, the removal of the covers 41, 42 can form engagement holes (not shown) in the respective outer side panels 23, 25 so that the inner locking tabs 9, 10 of the inner construct 17 are accessible through the openings formed by the respective engagement devices 37, 38 in the outer construct 49. In the illustrated embodiments, a user can grip the engagement holes formed by the engagement devices 37, 38 (e.g., with the thumb and index finger of one hand) and press the inner locking tabs 9, 10 inwardly, causing the first locking edges 19, 20 to move inwardly and away (out of alignment with) from the second locking edges 50, 51. When the inner locking tabs 9, 10 of the inner construct 17 are pressed inwardly in this way, the second locking edges 50, 51 of the outer construct 49 are no longer blocked by the first locking edges of the inner construct 17.

While engaging the inner locking tabs 9, 10 via the openings formed by the engagement devices 37, 38, the user can grip the inner construct 17 via the engagement recesses 53, 54 in the outer construct 17 (e.g., with the thumb and index finger of the other hand). The user can pull the constructs 17, 49 apart with both hands while pressing inwardly on the inner locking tabs 9, 10 via the openings formed in the outer construct 49 by the engagement devices 37, 38 and by pulling on the inner construct 17 via the engagement recesses 53, 54 in the outer construct 49. In embodiments, it is difficult or impossible for a child to carry out the unlocking and opening operation (e.g., due to limitations in hand size and/or dexterity).

In the illustrated embodiments, once the constructs 17, 49 are separated (e.g., similar as shown in FIGS. 5A and 5B), the opening 18 of the inner construct 17 is accessible for removing or adding items. The carton 55 could be reclosed and/or reopened according to the assembling and unlocking/separating operations as described above. In embodiments, the reclosed carton 55 is again protected against unwanted opening (e.g., by children) by the locking engagement of the inner locking tabs 9, 10 with the respective outer locking tabs 33, 34 once the inner construct 17 is fully inserted into the outer construct 49.

In exemplary embodiments, the shortest distance of the engagement features 37, 38 and/or the engagement recesses 53, 54 from each other along the outer sides of the carton 55 in its closed configuration is dimensioned such that it is difficult or impossible for a child (e.g., with an age of up to three years, of up to four years, of up to five years, of up to six years, etc.) to unlock the carton 55, and it is difficult or impossible to pull the outer construct 49 and inner construct 17 apart when in the locked configuration. In embodiments, this dimensioning is based on average body measurements of a child, regardless of gender, in the respective age group, in the EU or in North America, depending on the region for which the everted box is intended. In examples, the distance between the outer sides of the second side walls can be about 50 to about 120 mm, about 70 to about 100 mm, about 60 to about 90 mm, about 80 to about 90 mm, or about 70 to about 80 mm. This can help ensure that a child's hands cannot engage in all the engagement holes simultaneously in order to unlock the folding carton, while an adult (e.g., who may have larger hands) is able to reach the locking features to unlock and open the carton 55.

In the carton 55 according to the present disclosure, the inner locking tabs 9, 10 and the outer locking tabs 33, 34 form an interlock when the inner construct 17 is moved into the outer construct 49. This is because the inner locking edges 19, 20 can bear against the outer locking edges 50, 51 so that they prevent the inner construct 17 from being pulled out of the outer construct 49. Pulling the inner construct 17 out of the outer construct 49 can require, for example, that the interlock between the outer part and the inner part be released. To do this, the user can use the thumb and index finger of one hand to engage the engagement openings 45, 46 and compress the inner locking tabs 9, 10 slightly so that the outer locking edges 50, 51 no longer block the path of the inner locking edges 19, 20. With the thumb and index finger of the other hand, the user can grip a portion of the inner construct 17 (e.g., along or adjacent the bottom panel 2) through the second engagement openings/recesses 53, 54 and pull the inner construct 17 and outer construct 49 apart. In doing so, the inner locking tabs 9, 10 slide past the user's thumb and index finger that engage the first engagement apertures 45, 46 and compress the first locking tabs 9, 10 slightly. Unlocking by a child may be prevented or made difficult by sizing the carton so that the child, due to the comparatively small size of the child's hands, is not able to engage in the engagement openings 45, 46 in the manner described. Unlocking can require, for example, a certain understanding of the function of the latch, which is usually not yet present in a child up to the age of six, for example. As a result, a child is prevented from unlocking the carton 55 according to the disclosure and is protected from the associated dangers. In addition, the carton 55 is protected against unintentional opening, which can occur with an everting carton that does not include the locking features, for example, if it is lifted at the outer construct without supporting the inner construct so that the inner construct slips out of the outer construct in the absence of the locking features.

In embodiments of the carton 55 according to the disclosure, initial opening protection can be provided by the cover panels 41, 42, which can prevent or resist partial compression of the inner locking tabs 9, 10 so that the inner locking tabs 9, 10 are not disengaged from the outer locking tabs 33, 34. For example, only by tearing along the weakening lines 39, 40 to at least partially remove the cover panels 41, 42 and form the engagement openings 45, 46 is it possible to compress the inner locking tabs 9, 10 to open the carton 55 for the first time. In exemplary embodiments, the cover panels 41, 42 in the outer side panels 23, 25 of the outer construct 49 can be glued to the inner construct 17 (e.g., to the respective inner locking tabs 9, 10), which further can help resist or prevent opening of the carton 55 until the cover panels 41, 42 are separated from the outer side panels 23, 25. In addition, the package is prevented from being opened prior to purchase by an interested consumer. For example, tearing of the lines of weakening 39, 40 and/or other tearing of the carton 55 from attempts to force the carton open can provide a potential purchaser an indication that the package has been accessed or tampered with (e.g., wherein products may have been removed from the carton 55 and/or other objects may have been inserted into the carton 55).

In exemplary embodiments, the carton 55 may have tolerances in its formation, for example, when the constructs 17, 49 are formed from the flat, glued blanks 1, 21 by a packager. These tolerances may lead to small variations in the relative sizes of the constructs 17, 49. However, the two layers of thickness of the inner locking tabs 9, 10 and of the outer locking tabs 33, 34 (e.g., where their respective proximal and distal portions are in overlapping relationships) can help compensate for such tolerances and variations that can occur during the production of the blanks and the erection and bonding of the inner construct and/or the outer construct. This can be advantageous for secure locking of the carton despite the tolerances.

The blanks according to any of the embodiments of the present disclosure can be, for example, formed from coated paperboard and similar materials. For example, the interior and/or exterior sides of the blank can be coated with a clay coating. The clay coating may then be printed over with product, advertising, price coding, and other information or images. The blank may then be coated with a varnish to protect any information printed on the blank. The blank may also be coated with, for example, a moisture barrier layer, on either or both sides of the blank. In accordance with the above-described embodiments, the blank may be constructed of paperboard of a caliper such that it is heavier and more rigid than ordinary paper. The blank can also be constructed of other materials, such as cardboard, hard paper, or any other material having properties suitable for enabling the carton to function at least generally as described herein. The blank can also be laminated or coated with one or more sheet-like materials at selected panels or panel sections.

In accordance with the exemplary embodiments of the present disclosure, a fold line can be any substantially linear, although not necessarily straight, form of weakening that facilitates folding therealong. More specifically, but not for the purpose of narrowing the scope of the present disclosure, fold lines include: a score line, such as lines formed with a blunt scoring knife, or the like, which creates a crushed or depressed portion in the material along the desired line of weakness; a cut that extends partially into a material along the desired line of weakness, and/or a series of cuts that extend partially into and/or completely through the material along the desired line of weakness; and various combinations of these features. In situations where cutting is used to create a fold line, typically the cutting will not be overly extensive in a manner that might cause a reasonable user to incorrectly consider the fold line to be a tear line.

As an example, a tear line can include: a slit that extends partially into the material along the desired line of weakness, and/or a series of spaced apart slits that extend partially into and/or completely through the material along the desired line of weakness, or various combinations of these features. As a more specific example, one type of tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

The above embodiments may be described as having one or more panels adhered together by glue during erection of the carton embodiments. The term "glue" is intended to encompass all manner of adhesives commonly used to secure carton panels in place.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A carton comprising:

an inner construct comprising a plurality of inner panels extending at least partially around a first interior of the inner construct, wherein the inner construct comprises an inner locking tab foldably connected to at least one inner panel of the plurality of inner panels; and an outer construct comprising a plurality of outer panels extending at least partially around a second interior of the outer construct, the inner construct being at least partially received in the second interior of the outer construct, wherein the outer construct comprises an outer locking tab foldably connected to at least one outer panel of the plurality of outer panels; and an engagement feature extending in the at least one outer panel of the outer construct, the engagement feature comprising a cover panel that is at least partially separable from the at least one outer panel for forming an engagement hole in the at least one outer panel;

wherein the inner locking tab of the inner construct extends along the engagement feature in the outer construct so that the inner locking tab can be engaged via the engagement hole when the cover panel is at least partially removed for moving the inner locking tab with respect to the outer locking tab for facilitating movement of the inner construct and the outer construct relative to one another from a closed configuration to an open configuration, the inner locking tab comprises an inner proximal section foldably connected to the at least one inner panel and an inner distal section foldably connected to the inner proximal section along a first fold line, the inner distal section being folded along the first fold line into face-to-face contact with the inner proximal section, the outer locking tab comprises an outer proximal section foldably connected to the at least one outer panel and an outer distal section foldably connected to the outer proximal section along a second fold line, the outer distal section being folded along the second fold line into face-to-face contact with the outer proximal section, the first fold line of the inner locking tab and the second fold line of the outer locking tab engage one another for resisting movement between the inner construct and the outer construct, the inner locking tab is a first inner locking tab, the at least one inner panel comprises a first inner panel, the outer locking tab is a first outer locking tab, the at least one outer panel comprises a first outer panel, and the engagement feature is a first engagement feature, wherein the inner construct further comprises a second locking tab foldably connected to a second inner panel of the plurality of inner panels, the outer construct further comprises a second outer locking tab foldably connected to a second outer panel of the plurality of outer panels and a second engagement feature extending in the second outer panel, and the second inner locking tab and the second outer locking tab cooperate to limit movement between the inner construct and the outer construct.

2. The carton of claim 1, wherein the cover panel is at least partially separable from the at least one outer panel along a weakening line.

3. The carton of claim 1, further comprising an engagement recess extending in the outer construct, wherein at least a portion of the inner construct extends along at least a portion of the engagement recess in the outer construct so that the inner construct can be gripped via at least the engagement recess in the outer construct.

4. The carton of claim 3, wherein the engagement recess extends along at least a portion of the outer locking tab and the at least one outer panel.

5. The carton of claim 3, wherein the plurality of outer panels of the outer construct comprises a top panel foldably connected to the at least one outer panel, the outer construct comprises an opening opposite to the top panel, the inner construct being selectively movable through the opening, and wherein the engagement feature is closer to the top panel than the opening and the engagement recess extends along the opening.

6. The carton of claim 1, wherein the cover panel is a first cover panel and the engagement hole is a first engagement hole, wherein the second engagement feature comprises a second cover panel that is at least partially separable from the second outer panel for forming a second engagement hole in the second outer panel, and wherein the second inner locking tab of the inner construct extends along the second engagement feature in the outer construct so that the second inner locking tab can be engaged via the second engagement hole when the second cover panel is at least partially removed for moving the second inner locking tab with respect to the second outer locking tab.

7. The carton of claim 1, wherein each of the first inner locking tab and the second inner locking tab has a first locking edge and each of the first outer locking tab and the second outer locking tab has a second locking edge facing the respective first locking edge for limiting movement between the inner construct and the outer construct.

8. The carton of claim 1, wherein at least one of the inner proximal section and the inner distal section being attached to the at least one inner panel and at least one of the outer proximal section and the outer distal section being attached to the at least one outer panel.

9. The carton of claim 8, wherein the inner construct comprises a first opening, the inner proximal section is foldably connected to the at least one inner panel along the first opening, the outer construct comprises a second opening opposite to the first opening of the inner construct, and the outer proximal section is foldably connected to the at least one outer panel along the second opening.

10. The carton of claim 1, wherein the plurality of outer panels of the outer construct comprises a top panel foldably connected to the at least one outer panel, the outer construct comprises an opening opposite to the top panel, the inner construct being movable through the opening, and wherein the engagement feature is closer to the top panel than the opening.

11. The carton of claim 1, wherein the inner construct comprises an opening for inserting and/or removing items from the first interior, the opening in the inner construct being at least partially enclosed by the outer construct.

12. In combination, a first blank and a second blank for cooperating to at least partially form a carton, the first blank comprising a plurality of inner panels and an inner locking tab foldably connected to at least one inner panel of the plurality of inner panels, wherein the first blank is for forming an inner construct;

the second blank comprising a plurality of outer panels and an outer locking tab foldably connected to at least one outer panel of the plurality of outer panels, wherein the second blank is for forming an outer construct for at least partially receiving the inner construct formed from the first blank when the carton is formed from the first blank and the second blank; and an engagement feature extending in the at least one outer panel of the second blank, the engagement feature comprising a cover panel that is at least partially separable from the at least one outer panel for forming an engagement hole in the at least one outer panel, wherein the engagement feature is for facilitating engagement of the inner locking tab for moving the inner locking tab with respect to the outer locking tab when the carton is formed from the first blank and the second blank, the inner locking tab comprises an inner proximal section foldably connected to the at least one inner panel and an inner distal section foldably connected to the inner proximal section along a first fold line, the inner distal section for being folded along the first fold line into face-to-face contact with the inner proximal section when the inner construct is formed from the first blank;

the outer locking tab comprises an outer proximal section foldably connected to the at least one outer panel and an outer distal section foldably connected to the outer proximal section along a second fold line, the outer distal section for being folded along the second fold line into face-to-face contact with the outer proximal section when the outer construct is formed from the second blank; and the first fold line of the inner locking tab and the second fold line of the outer locking tab are configured for engaging one another for resisting movement between the inner construct formed from the first blank and the outer construct formed from the second blank when the carton is formed from the first blank and the second blank, the inner locking tab is a first inner locking tab, the at least one inner panel comprises a first inner panel, the outer locking tab is a first outer locking tab, the at least one outer panel comprises a first outer panel, and the engagement feature is a first engagement feature, wherein the first blank further comprises a second locking tab foldably connected to a second inner panel of the plurality of inner panels, the second blank further comprises a second outer locking tab foldably connected to a second outer panel of the plurality of outer panels and a second engagement feature extending in the second outer panel, and the second inner locking tab and the second outer locking tab are configured for selectively cooperating to limit movement between the inner construct formed from the first blank and the outer construct formed from the second blank when the carton is formed from the first blank and the second blank.

13. The combination of claim 12, wherein the cover panel is at least partially separable from the at least one outer panel along a weakening line.

14. The combination of claim 12, further comprising an engagement opening extending in the second blank for forming an engagement recess when the outer construct is formed from the second blank for facilitating gripping of the inner construct formed from the first blank when the carton is formed from the first blank and the second blank.

15. The combination of claim 14, wherein the outer locking tab is foldably connected to the at least one outer panel along a fold line, and the engagement opening extends in at least a portion of the outer locking tab and the at least one outer panel along the fold line.

16. The combination of claim 14, wherein the plurality of outer panels of the second blank comprises a top panel foldably connected to the at least one outer panel opposite to the outer locking tab, and wherein the engagement feature is closer to the top panel than the outer locking tab and the engagement opening extends in the at least one outer panel and the outer locking tab.

17. The combination of claim 12, wherein the cover panel is a first cover panel and the engagement hole is a first engagement hole, wherein the second engagement feature comprises a second cover panel that is at least partially separable from the second outer panel for forming a second engagement hole in the second outer panel.

18. The combination of claim 12, wherein the plurality of outer panels of the outer construct comprises a top panel foldably connected to the at least one outer panel opposite to the outer locking tab, and wherein the engagement feature is closer to the top panel than the outer locking tab.

19. A method of forming a carton, the method comprising:

obtaining a first blank comprising a plurality of inner panels and an inner locking tab foldably connected to at least one inner panel of the plurality of inner panels;

forming an inner construct from the first blank by folding the plurality of inner panels at least partially around a first interior of the inner construct;

obtaining a second blank comprising a plurality of outer panels and an outer locking tab foldably connected to at least one outer panel of the plurality of outer panels, an engagement feature extending in the at least one outer panel, the engagement feature comprising a cover panel that is at least partially separable from the at least one outer panel for forming an engagement hole in the at least one outer panel;

forming an outer construct from the second blank by folding the plurality of outer panels at least partially around a second interior of the outer construct; and moving at least one of the inner construct and the outer construct relative to the other to assemble the carton with the inner construct at least partially received in the second interior of the outer construct;

wherein the inner locking tab of the inner construct extends along the engagement feature in the outer construct so that the inner locking tab can be engaged via the engagement hole when the cover panel is at least partially removed for moving the inner locking tab with respect to the outer locking tab for facilitating movement of the inner construct and the outer construct relative to one another from a closed configuration to an open configuration, the inner locking tab comprises an inner proximal section foldably connected to the at least one inner panel and an inner distal section foldably connected to the inner proximal section along a first fold line, wherein the forming the inner construct comprises folding the inner distal section along the first fold line into face-to-face contact with the inner proximal section and folding the inner locking tab into an overlapping relationship with the at least one inner panel, the outer locking tab comprises an outer proximal section foldably connected to the at least one outer panel and an outer distal section foldably connected to the outer proximal section along a second fold line, wherein the forming the outer construct comprises folding the outer distal section along the second fold line into face-to-face contact with the outer proximal section and folding the outer locking tab into an overlapping relationship with the at least one outer panel, and the first fold line of the inner locking tab and the second fold line of the outer locking tab engage one another for resisting movement between the inner construct and the outer construct, the inner locking tab is a first inner locking tab, the at least one inner panel comprises a first inner panel, the outer locking tab is a first outer locking tab, the at least one outer panel comprises a first outer panel, and the engagement feature is a first engagement feature, wherein the inner construct further comprises a second locking tab foldably connected to a second inner panel of the plurality of inner panels, the outer construct further comprises a second outer locking tab foldably connected to a second outer panel of the plurality of outer panels and a second engagement feature extending in the second outer panel, and the second inner locking tab and the second outer locking tab cooperate to limit movement between the inner construct and the outer construct.

20. The method of claim 19, wherein the cover panel is at least partially separable from the at least one outer panel along a weakening line.

21. The method of claim 19, further comprising an engagement opening extending along at least a portion of the outer locking tab and the at least one outer panel in the second blank, wherein the forming the outer construct comprises folding the outer locking tab into an overlapping relationship with the at least one outer panel, which forms the engagement opening into an engagement recess of the outer construct for facilitating gripping the inner construct.

22. The method of claim 21, wherein the plurality of outer panels of the second blank comprises a top panel foldably connected to the at least one outer panel opposite to the outer locking tab, wherein the engagement feature is closer to the top panel than the outer locking tab in the second blank.

23. The method of claim 19, comprising attaching at least one of the inner proximal section and the inner distal section to the at least one inner panel and attaching at least one of the outer proximal section and the outer distal section to the at least one outer panel.

24. The method of claim 23, wherein the inner construct comprises a first opening, the inner proximal section is foldably connected to the at least one inner panel along the first opening, the outer construct comprises a second opening opposite to the first opening of the inner construct, and the outer proximal section is foldably connected to the at least one outer panel along the second opening.

25. The method of claim 19, wherein the inner construct comprises an opening for inserting and/or removing items from the first interior, the opening in the inner construct being at least partially enclosed by the outer construct.

* * * * *